March 14, 1939.  A. CHILTON  2,150,540
REDUCTION GEAR
Filed July 8, 1937
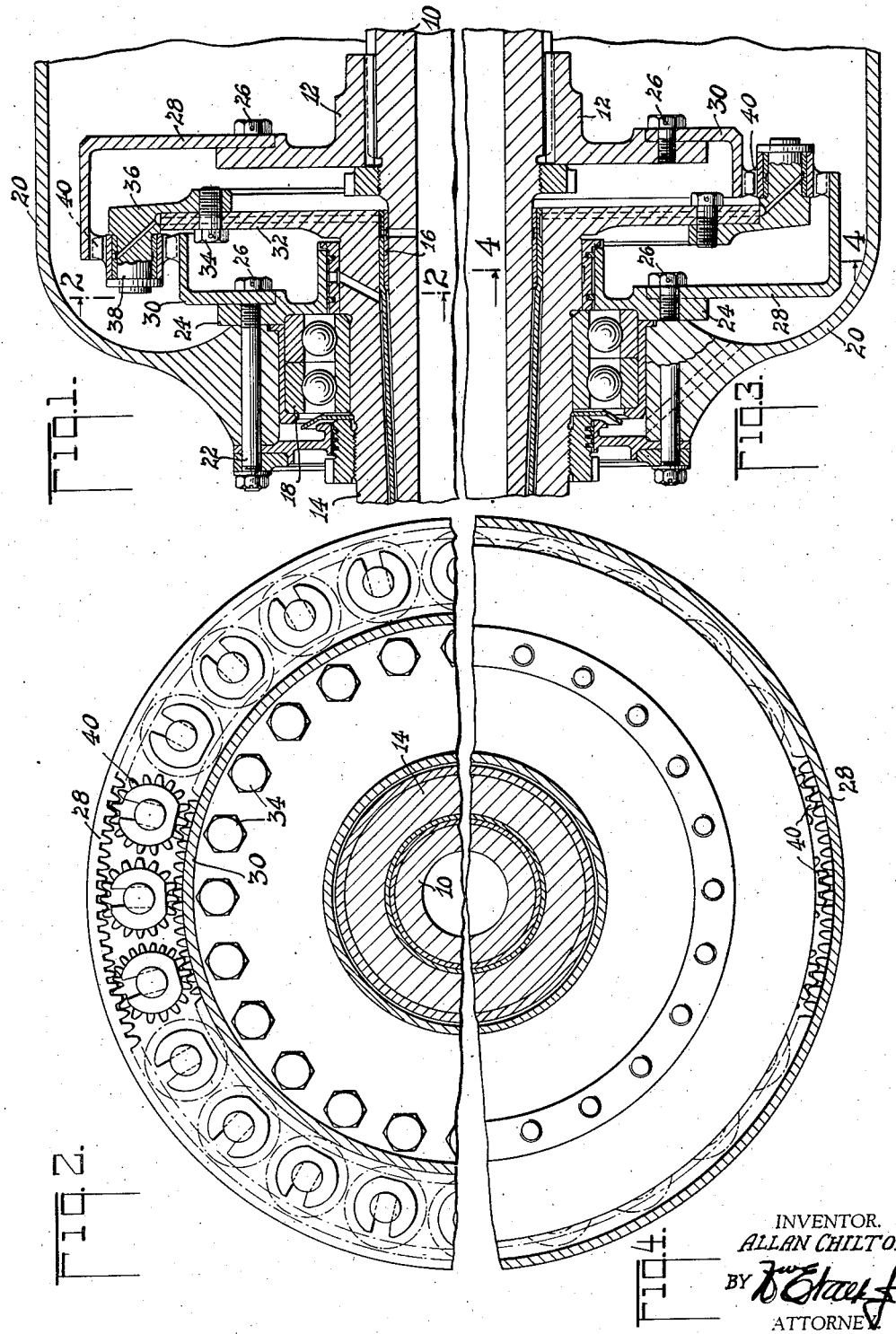
INVENTOR.
ALLAN CHILTON
BY
ATTORNEY Patented Mar. 14, 1939

2,150,540

UNITED STATES PATENT OFFICE 2,150,540

REDUCTION GEAR

Allan Chilton, Glen Rock, N. J., assignor to Wright Aeronautical Corporation, a corporation of New York Application July 8, 1937, Serial No. 152,493

10 Claims. (Cl. 74—305)

This invention relates to reduction gears, the specific embodiment of the drawing illustrating a design for aircraft engines.

As the size and speed of aircraft engines increase, the propeller gear reduction required becomes greater and gear ratios in the vicinity of 2:1 are desired. The most widely used gears are of the spur planetary type wherein planet pinions are carried by the propeller shaft, driven by a ring gear secured to the engine crankshaft and engaging a sun gear anchored to the gear housing. In such gears the difference in diameter between the sun and ring gears gets smaller as the ratios approach 2:1 which ratio cannot be obtained in this simple planetary type since it would involve pinions of infinitely small diameter.

Within certain practical limitations, however, the small diameter of planet pinion associated with ratios near 2:1 is of great advantage in that it permits the use of a great number of pinions, whereby the driving load is divided over a correspondingly great number of tooth contacts, correspondingly increasing the power that may be transmitted with any given ring and sun gears.

It will be understood that a given engine will be used in airplanes of different speed and performance characteristics requiring different propeller diameters and speeds so that, as the art has developed, the number of different reduction gear ratios called for has increased to the point where the manufacturer has to develop several different gears for each engine.

A prime object of the present invention is to provide an organization which, by alternate assembly, will provide two different ratios, respectively above and below 2:1. With the specific portions of the drawing, the ratios are 1.80:1 and 2.25:1. Other advantages will be pointed out in, or will be obvious from, the following description, with reference to the drawing in which, Figs. 1 and 3 comprise fragmentary axial sections indicating the alternate assemblies of the parts;

Fig. 2 is a fragmentary transverse section on the line 2 of Fig. 1, and

Fig. 4 is a fragmentary transverse section on the line 4 of Fig. 3.

In the drawing, 10 designates a portion of a conventional engine crankshaft to which there is splined a hub member 12 and on which is mounted a propeller shaft 14 on bushings, one of which is indicated as 16. The propeller shaft is carried in the usual thrust bearings 18, secured in a nose or gear housing 20, by bolts 22, which also secure an anchor member 24 to the housing 20. This member and the hub member 12 are of similar peripheral form and are provided with similar tapped holes for screws 26 for securing, optionally on either member, a ring gear 28 or a sun gear 30.

The propeller shaft 20 is provided, at its right hand end, with a large flange 32 to which there is secured detachably by screws 34 a spider member 36 equipped with journals 38 on which are mounted planet pinions 40. The spider member 36 is arranged so that it may be assembled on either side of the propeller shaft disc 32, giving the alternative disposition shown in Figs. 1 and 3. In Fig. 1 the ring gear 28 is secured to the crankshaft to comprise the driver and the sun gear 30 to the housing 20 to comprise the anchored member of the gear. Alternately, according to Fig. 3, the ring gear 28 may be secured to the nose to comprise the fixed member and the sun gear 30 to the crankshaft to comprise the driving member. With the proportions shown, the disposition of Fig. 1 affords a gear ratio of 1.80:1 while that of Fig. 3 gives a ratio of 2.25:1. Ratios of this order are in current demand and it will be seen that by the provisions of this invention two different ratios on either side of a mean of 2:1 are afforded with the identical set of parts, whereby two gear ratios are provided with the development and tooling costs of a single design.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with an engine crankshaft and a gear housing each having a similar gear mounting means, of an annular gear and a sun gear adapted to be mounted interchangeably thereon, a propeller shaft, and a planet carrier adapted to be mounted in two different attitudes upon said shaft whereby the parts may be alternately assembled to afford two different gear ratios.

2. A reduction gear comprising, in combination, a propeller shaft, a planet assemblage carrying planet pinions adapted to be mounted facing fore or aft upon said shaft, a sun gear and a ring gear, a crankshaft gear mounting, and a similar housing gear mounting, whereby the whole may be assembled with the ring or the sun gear on the crankshaft and the other gear on the housing, with the planet carrier in the appropriate position for planet pinion engagement with said gears.

3. A reduction gear including, in combination, a crankshaft gear mounting, a housing gear mounting, a sun gear and a ring gear adapted for assembly on either of said mountings, a planet carrier, and a propeller shaft on which said planet carrier is mounted, said gears being interchangeable according as it is desired to have the sun gear or the ring gear comprise the driving member thereby affording alternate gear ratios with the same propeller shaft and planet carrier.

4. In a reduction gear, a casing having a gear mounting, a drive shaft having a similar gear mounting axially spaced from and concentric with the first mounting, concentric sun and ring gears interchangeably mountable on said gear mountings, a driven shaft, and a plurality of planet pinions mounted on said shaft in axial parallelism therewith, each pinion engaging the ring and sun gear teeth, said ring and sun gears being interchangeable to afford different gear ratios.

5. In a reduction gear, a casing having a gear mounting, a drive shaft having a similar gear mounting axially spaced from and concentric with the first mounting, concentric sun and ring gears interchangeably mountable on said gear mountings, a driven shaft, and a plurality of planet pinions mounted on said shaft in axial parallelism therewith, each pinion engaging the ring and sun gear teeth, said ring and sun gears being interchangeable to afford different gear ratios, said pinion plurality exceeding six whereby the power transmission load for any one pinion is relatively small due to the large number of pinions.

6. In combination in a reduction gear, a fixed gear mounting, a rotatable gear mounting concentric therewith, ring and sun gears interchangeably mountable on either mounting to afford two different gear ratios, and a planet carrier having planet pinions journaled thereon engageable with the ring and sun gears in either mounting disposition thereof.

7. In combination in a reduction gear, two similar, concentric axially spaced gear mountings, ring and sun gears interchangeably mountable on either mounting, a planet carrier concentric with said mountings, and planet pinions journaled on said carrier each engaging both said gears in either mounting arrangement thereof.

8. In combination two concentric axially spaced gear mountings, gears of different diameter interchangeably mounted on each, a planet carrier between said gears, and planet pinions journaled on said carrier engaging said gears in either of the interchangeable mounting positions thereof.

9. In combination, a plurality of axially spaced concentric gear mountings, an equal plurality of different sized gears interchangeably mountable on said mountings, a planet carrier, and pinions journaled on said carrier for driving engagement with said gears in all of the several mounting dispositions thereof.

10. In combination, a plurality of axially spaced concentric gear mountings, an equal plurality of different sized gears interchangeably mountable on said mountings, a planet carrier, and pinions journaled on said carrier for driving engagement with said gears in all of the several mounting dispositions thereof, said pinions being adjustable to a plurality of axial positions on the carrier in accordance with the several mounting dispositions of said gears.

ALLAN CHILTON.